United States Patent Office 3,446,826
Patented May 27, 1969

3,446,826
PREPARATION OF ALKYLTIN CHLORIDES, BROMIDES, AND IODIDES
Harold Coates, Wombourn, and Peter Albert Theodore Hoye, Dunsley, Kinver, Stourbridge, England, assignors to Albright & Wilson (Mfg.) Limited, Oldbury, near Birmingham, Warwickshire, England, a British company
No Drawing. Filed Nov. 12, 1965, Ser. No. 507,578
Claims priority, application Great Britain, Dec. 2, 1964, 49,071/64
Int. Cl. C07f 7/22
U.S. Cl. 260—429.7
19 Claims

ABSTRACT OF THE DISCLOSURE

The present invention provides a process for preparing alkyltin halides which comprises reacting an alkyl chloride, alkyl bromide or alkyl iodide with metallic tin in the initial presence of, as catalyst, a salt containing an inorganic cation and an anion selected from the group consisting of halostannite anions $(SnX_3)^-$ and halostannate anions $(R_nSnX_{(6-n)})^=$ and $(R_nSnX_{5-n})^-$, wherein each X is a chlorine, bromine or iodine atom, each R is an alkyl group, and $n$ is an integer 0–3, thereby forming alkyltin halide and receiving said alkyltin halide.

---

This invention relates to the preparation of organotin halides by the direct reaction of metallic tin with an organic halide in the presence of a catalyst of specified type.

The direct reaction of tin with alkyl halides to form organotin halides presents serious problems, especially when the alkyl chlorides and bromides are employed. As a consequence it has, in the past, been customary to prepare organotin halides by processes employing more expensive and less readily available materials, for example Grignard reagents. To overcome these difficulties it has recently been proposed to react alkyl halides directly with tin in the presence of certain catalysts. For example, compounds of divalent sulphur or selenium may be employed but these possess the disadvantage of a disagreeable odour and are difficult to remove from the organotin products.

We have now discovered that certain organotin halides may advantageously be prepared by the reaction of an aliphatic halide with metallic tin in the presence as catalyst of a salt of an inorganic cation and a halostannite or halostannate anion. We have further discovered that the catalytic effect of such salts is enhanced by the use of a solvent which contains one or more oxygen atoms.

Accordingly, our invention provides a method for the preparation of aliphatic-organotin halides which comprises reacting an aliphatic halide with metallic tin, or an alloy thereof, in the presence as catalyst of a salt having an inorganic cation and a halostannite anion $[SnX_3]^-$ or a halostannate anion $[R_nSnX_{6-n}]^{2-}$ or $[R_nSnX_{5-n}]^-$, wherein each X represents a halogen atom, each R represents an aliphatic organic radical and $n$ may be zero or an integer from 1 to 3. For convenience the halostannate ions specified herein are usually given the formula $[R_nSnX_{6-n}]^{2-}$, though it should be understood that the ion may actually be a 1:1 complex ion of the formula $[R_nSnX_{5-n}]^-$.

The preferred salts for use as catalysts according to our invention are the alkali metal (including ammonium) halostannite salts of formula $M_1[SnX_3]$, wherein $M_1$ is an alkali metal or ammonium cation and each X is chlorine, bromine, or iodine, for example the sodium salts, e.g. $Na[SnBrCl_2]$ and $Na[SnCl_3]$; the ammonium salts, e.g. $NH_4[SnI_3]$; and more especially the lithium salts, e.g. $Li[SnBr_3]$ and $Li[SnCl_3]$. Other halostannite and halostannate salts which may advantageously be employed include $Li_2[SnCl_6]$, $Li_2[C_2H_5SnBr_5]$ and $$Li_2[(C_3H_7)_2SnCl_2Br_2]$$

salts of Group II metals, e.g. $Ca[SnCl_6]$, $Mg[SnCl_3]_2$, $Cd[SnCl_2I]_2$ and $Ba[SnBr_2I]_2$; and of Group III metals, e.g. $Al[SnBr_3]_3$, and $Al_2[(C_6H_{13})_3SnBr_3]_3$. It will be noted that the halostannate anion may contain organic groups covalently bound to the tin atom. However, it is preferred that the cations associated with the halostannite and/or halostannate anion catalyst should be purely inorganic.

The catalyst may be preformed by reacting a metal (including ammonium) halide with a stannous halide, a stannic halide, or an organostannic halide $(R_nSnX_{4-n})$, where $n$ is 1, 2 or 3). Alternatively, the catayst may be formed in situ by adding a metal halide, for example an alkali metal halide, to a mixture of tin, stannous chloride and aliphatic halide thereby forming a catalyst containing the halostannite anion. Another convenient method of forming the catalyst in situ is to add a metal halide and an organotin halide, for example a heel of aliphatic-organotin halide from a previous preparation, thereby forming a catalyst containing the halostannate anion.

The process of the invention is preferably carried out by heating the tin, aliphatic halide and catalyst together, usually at elevated temperatures, for example at 50° C. to 250° C., and preferably at 100° C. to 200° C. It is often convenient to carry out the reaction in a pressure vessel under autogeneous pressure. The aliphatic halide may be present in considerable stoichiometric excess, for example about 4 to 5 times the theoretical quantity. If, after heating for 6 to 12 hours the reaction is not complete the unreacted tin and halide may be each readily recoverable for re-use or the reaction time may be increased until all the tin has reacted. The catalyst anion may be present in any desired amount, but preferably in an amount of 0.02 to 0.5 mole based on the molar amount of tin present.

The reactants and catalyst may be merely heated together with the excess of the aliphatic halide providing the desired reaction medium, but the reaction is preferably performed in the presence of a solvent. We have found that solvents which contain one or more oxygen atoms readily dissolve the halostannite and halostannate salts. Such solvents increase the catalytic action of the halostannites and halostannates by increasing their solubility in the aliphatic halide. Preferred solvent assistants include: ethers, e.g. diethyl ether, tetrahydrofuran, and especially diethers such as dioxan, ethylene glycol dimethyl ether (Diglyme), and diethylene glycol diethyl ether; alcohols, e.g. butyl alcohol, octyl alcohol; glycols, e.g. polyoxyethylene and poyoxypropyene glycols; monoethers of polyoxyethylene glycols, e.g. diethylene glycol monobutyl ether; carbonyl compounds, e.g. methyl isobutyl ketone; carboxylic acids, e.g. acetic acid or propionic acid; aqueous solutions of hydrotropes, such as salts of sulphonic acids e.g. toluene sulphonic acid and xylene sulphonic acid; and water itself. Such solvent assistants can also be used in conjunction with diluents, e.g. liquid hydrocarbons.

By aliphatic halide we mean herein a compound in which a chlorine, bromine or iodine atom is linked to an aliphatic carbon atom. The aliphatic carbon atom may be part of an alkyl group, an aralkyl group or an alkenyl group of the allylic type. Preferred halides for present use are methyl, ethyl, propyl, butyl, hexyl and octyl chlorides, bromides or iodides, particularly those having from 3 to 8 carbon atoms; as well as allyl chloride, methallyl chloride and benzyl and nuclear-substituted benzyl chlorides, bromides and iodides. Though the reactivities of the bromides and iodides are greater, it is preferred to use the chlorides since these are much less expensive and it is a feature of the present invention that aliphatic chlorides may be employed in the production of organotin halides by the direct reaction therewith of metallic tin or alloys thereof.

The metallic tin may be powdered to increase its surface area or may be in the form of sheet or pieces of granulated metal. Alloys of tin may be used, particularly alloys containing those metals already known to assist catalysis of the reaction of aliphatic halides with tin, e.g. Ca, Mg, Zn, Cd, Cu, Ni, Ti, Mn, Fe, Al or Cr.

The catalysts of our invention may, if desired be used in conjunction with any other known catalyst for the reaction of tin with an organotin halide. For example iodine, and interhalogen compounds have been found effective in assisting the catalytic action of the trihalostannites.

The organotin halides produced according to the invention find use as such, but are more usually converted into other organotin compounds by standard methods, which usually involve the alkaline hydrolysis of the organotin halide to produce the corresponding organotin oxide.

The process is illustrated by the following examples in which all parts are expressed on a weight basis unless otherwise stated.

Example 1.—Reaction with butyl bromide using $Li_2[Bu_2SnBr_4]$ with Diglyme

Anhydrous lithium bromide (44 parts) was dissolved in diethylene glycol dimethyl ether (Diglyme) (67.5 parts). The solution was added to a solution of dibutyltin dibromide (100 parts) in butyl bromide (450 parts) and tin sheet (83 parts). The mixture was heated under reflux for 45 hours after which time all the tin had dissolved; the final reflux temperature was 114° C. A further 61 parts tin sheet were added and reflux continued. This tin reacted rapidly and the reflux temperature rose to 120° C. when a further 100 parts butyl bromide were added. The second portion of tin reacted to completion in 6½ hours.

The mixture was stripped to remove unreacted butyl bromide and then distilled to give a mixture of Diglyme, butyltin bromides (475 parts) and a residue which crystallised on cooling (154 parts). The distillate was shown by analysis to consist of a mixture of Diglyme (67 parts) and butyltin bromides consisting of a mixture of 16% $Bu_3SnBr$ and 84% $Bu_2SnBr_2$ (found: Sn, 26.4; Br, 32.8%). Thin layer chromatography showed only dibutyl- and tributyl-tin compounds). The residue (found: Sn, 29.5; Br, 54.3) analysed for a mixture of 12.5% LiBr and 87.5% $LiSnBr_3$.

Example 2.—Reaction of butyl bromide using $Na[SnBrCl_2]$ with Diglyme

Sodium bromide (10.2 parts) and stannous chloride (19 parts) were dissolved in Diglyme (30 parts) to form the halostannite salt $Na[SnBrCl_2]$. The solution of the catalyst was added to a mixture of tin sheet (60 parts), butyl bromide (360 parts) and iodine (0.5 parts) and the mixture heated under reflux for 25 hours. Unreacted tin (9 parts) was removed, the solution stripped of unreacted butyl bromide and distilled to give a mixture of butyltin bromides and Diglyme (200 parts) in which the organotin compounds consisted of a mixture of monobutyltin tribromide and dibutyltin dibromide (found: Sn, 24.6; Br, 36.5%) containing 79% $Bu_2SnBr_2$ and catalyst residue (42 parts). The yield of organotins on tin reacted was 96.4%.

Example 3.—Reaction of butyl bromide using $Na[SnBr_3]$ with Diglyme

Sodium bromide (10.2 parts) and stannous bromide (28 parts) were dissolved in Diglyme (30 parts) to form the complex $Na[SnBr_3]$. The solution of the catalyst was added to a mixture of tin sheet (62.5 parts), butyl bromide (360 parts) and iodine (0.5 part). The mixture was heated at reflux for 25 hours during which time all the tin reacted.

Distillation gave recovered butyl bromide 190 parts (found: Sn, 0.7% as $BuSnBr_3$), a mixture of Diglyme and butyltin bromides (found: Sn, 28.2; Br, 40.6%) (190 parts) and a residue (49 parts) of $NaSnBr_3$ and $SnBr_2$ which was readily soluble in Diglyme. The butyltin bromides consisted of a mixture of 13% monobutyltin tribromide and 87% dibutyltin dibromide. The yield of butyltin bromides was 87.7% on the tin used.

Example 4.—Reaction of butyl bromide using $Li[SnBr_3]$ with tetrahydrofuran

Anhydrous lithium bromide (22 parts) and stannous bromide (70 parts) were dissolved in tetrahydrofuran (50 parts) to form the halostannite catalyst $Li[SnBr_3]$. The catalyst solution was added to a mixture of tin sheet (82 parts), butyl bromide (450 parts), iodine (1.0 part) and dibutyltin dibromide (100 parts). The catalyst largely precipitated at room temperature but partly dissolved when the solution was heated to reflux. The mixture was heated at reflux for 113 hours after which time all the tin had reacted.

Example 5.—Reaction of butyl bromide using $Li[SnBr_3]$ with BuOH solvent

Anhydrous lithium bromide (22 parts) and stannous bromide (70 parts) were dissolved in n-butanol (60 parts). The catalyst solution was added to a mixture of tin (70.5 parts) butyl bromide (50 parts), iodine (0.5 part) and dibutyltin dibromide (100 parts). The clear solution was heated under reflux for 119 hours after which time all the tin had reacted.

Example 6.—Reaction of butyl bromide using $Li[SnBr_3]$ with Diglyme—successive use of catalyst A catalyst solution was prepared by dissolving anhydrous lithium bromide (22 parts) and stannous bromide (80 parts) in Diglyme (45 parts). The catalyst was added to a mixture of tin sheet (100 parts), butyl bromide (450 parts) and butyltin bromides (100 parts). The mixture was heated under reflux for 18 hours after which time all the tin had reacted. The final reaction temperature was 130° C. Distillation gave unreacted butyl bromide (200 parts), a mixture (476 parts) of butyltin bromides (average composition 78% $Bu_2SnBr_2$, 22% $BuSnBr_3$ from Sn and Br analyses) and Diglyme (found: Sn, 27.8; Br, 41.5%), and the catalyst (94 parts) as a distillation residue (found: Sn, 28.0; Br, 61.7%). This layer chromatography showed the product to consist of a mixture of $BuSnBr_3$, $Bu_2SnBr_2$ and $Bu_3SnBr$.

The catalyst residue (93 parts) was dissolved in Diglyme (45 parts) and tin sheet (100 parts), butyl bromide (450 parts) and dibutyltin bromides (100 parts) (found: Sn, 28.8%) added. The mixture was heated under reflux for 30 hours after which time all the tin had reacted. Distillation gave butyl bromide (216 parts) a mixture (444 parts) of butyltin bromides (4% $BuSnBr_3$ and 96% $Bu_2SnBr_2$) and Diglyme (found: Sn, 27.1%; Br, 37.1%) and a catalyst residue (116 parts). 116 Parts of the residue were dissolved in Diglyme (45 parts) and treated with a further quota of tin (100 parts) butyl bromide (450 parts) and butyltin bromides (100 parts) (found: Sn, 28.8%). The reaction was complete in 24 hours under reflux, the final reflux temperature being 124° C. Distillation gave butyl bromide (215 parts), a mixture (485 parts) of butyltin bromides (10% $BuSnBr_3$ and 90% $Bu_2SnBr_2$) and Diglyme (found: Sn, 27.5%; Br, 38.9%) and a catalyst residue (102.5 parts).

In a further successive reaction using the same quantities of reagents the reaction was complete in 24 hours, the final reaction temperature being 124° C. Distillation gave butyl bromide (216.5 parts), a mixture (460 parts) of butyltin bromides (12% $BuSnBr_3$, 88% $Bu_2SnBr_2$) and Diglyme (found: Sn, 27.3%; Br, 38.9%) and catalyst residue (104.8 parts).

The overall yield of butyltin bromides on tin used in the four reactions was 97.8%, and the amount of Diglyme recovered with the butyltin bromides was 164 parts (91%).

Example 7.—Reaction of octyl chloride using Li$_2$[oct$_2$SnCl$_2$Br$_2$] with Diglyme Anhydrous lithium bromide (22.2 parts) was dissolved in Diglyme (50 parts) and added to a mixture of octyl chloride (250 parts), dioctyltin dichloride (50 parts), tin foil (50 parts) and iodine (0.5 part). The mixture was heated under reflux for 21 hours after which time all the tin had reacted. Distillation gave recovered octyl chloride (151 parts), a mixture of (193.3 parts) Diglyme and octyltin chlorobromides (found: Sn, 22.4%) and a distillation residue of the catalyst (43.3 parts).

Example 8.—Reaction of octylchloride using

Li$_2$[oct$_2$SnCl$_2$Br$_2$]

with diethyleneglycol diethyl ether (diethyl carbitol)

Anhydrous lithium bromide (22.2 parts) was dissolved in diethyl carbitol (50 parts) and added to a mixture of tin foil (50 parts), octyl chloride (250 parts), dioctyltin dichloride (50 parts) and iodine (0.5 part). The mixture was heated under reflux for 22 hours and unreacted tin (0.4 part) was recovered. The product was washed with a solution of concenrtated HCl (25 parts) and methylated spirits (50 parts) in water (500 parts) to remove the catalyst and diethyl carbitol. The aqueous wash contained tin (6.7 parts) as stannous tin.

The octyl chloride solution of the product was stripped giving octyl chloride (152.4 parts) and octyltin chlorobromides (195.2 parts) (found: Sn, 23.2%) shown by thin layer chromatography to consist of a mixture of mono-, di- and tri-octyltin halides.

Example 9.—Reaction of octyl chloride using

Li$_2$[oct$_2$SnCl$_2$Br$_2$]

with polyoxypropylene glycol (Voranol P.400—Dow)

A solution of lithium bromide (22.2 parts) in Voranol P.400 (50 parts) was added to octyl chloride (250 parts) dioctyltin dichloride (50 parts), tin foil (50 parts) and iodine (0.5 part) and the mixture heated under reflux for 24 hours using a Dean & Stark distillation head to remove traces of water; all the tin reacted.

The product was washed as in Example 8. The aqueous wash contained tin (16.5 parts) as stannous tin (determined by iodine titration). The octyl chloride solution of the product was stripped giving a recovered octyl chloride fraction (148.6 parts) and octyltin chlorobromides (181.2 parts; found: Sn, 21.7%).

Example 10.—Reaction of octyl chloride using Li[SnCl$_2$I] and Li$_2$[oct$_2$SnCl$_2$I$_2$] with Digylme Anhydrous lithium iodide (19.3 parts) and stannous chloride (27.4 parts) were dissolved in Diglyme (50 parts) to give a solution of Li[SnCl$_2$I]. The solution of this catalyst was added to a mixture of tin (50 parts) dioctyltin dichloride (50 parts) and octyl chloride (250 parts). The mixture was heated under reflux for 4½ hours after which time all the tin had reacted. The catalyst solution remained partly insoluble in the reaction mixture throughout the reaction.

The product was washed as in Example 8. The aqueous wash contained tin (16 parts) as stannous tin. Distillation gave recovered octyl chloride (177 parts) and a residue of octyltin halides (199.3 parts). Thin layer chromatography showed the product to contain mono-, di, and tri-octyltin halides.

Example 11.—Reaction of octyl chloride using Li[SnCl$_2$I] alone with Diglyme

Example 10 was repeated but omitted the dioctyltin dichloride, and refluxing for 3 hours, 46 parts of tin reacted. Octyl chloride (173.3 parts) and octyltin halides (156 parts) were recovered, 16.6 parts of tin remained in the aqueous wash.

Example 12.—Reaction of octyl chloride using Li[SnCl$_2$I] with diethylene glycol dibutyl ether Example 10 was repeated using diethylene-glycol dibutyl ether (50 parts) in place of Diglyme. Tin (42 parts) reacted in 6 hours. Octyl chloride (159 parts) and an octyltin chloride-diethylene glycol dibutyl ether mixture (234 parts) (found: Sn, 23.1%) were recovered. Stannous tin (9.0 parts) was present in the aqueous wash. Thin layer chromatography showed the product fraction to contain mono- and dioctyltin compounds.

Example 13.—Reaction of octyl chloride using Li[SnCl$_2$I] with diethylene glycol Example 10 was repeated using diethylene glycol (50 parts) in place of Diglyme. The tin reacted to completion in 24 hours. Octyl chloride (179 parts) and octyltin halides (175.6 parts) (found: Sn, 20.9%) were recovered. The aqueous solution contained 20.8 parts of stannous tin. Thin layer chromatography showed the product to contain mono-, di- and tri-octyltin halides.

Example 14.—Reaction of octyl chloride using

Li$_2$[oct$_2$SnCl$_2$I$_2$]

with polyoxypropylene glycol

Lithium iodide (19.3 parts) was dissolved in polyoxypropylene glycol of molecular weight 2000 (50 parts) and dioctyltin dichloride (50 parts) was added. The catalyst solution was added to a mixture of tin (50 parts) and octyl chloride (250 parts). The mixture was heated at reflux. The tin (49 parts) was reacted for 9½ hours and the unreacted tin then removed. On distillation the solution gave dioctyltin dichloride (138 parts).

Example 15.—Reaction of butyl chloride using Li[SnCl$_2$I] with polyoxyethylene glycol Lithium iodide (17.1 parts) and stannous chloride (31.5 parts) were dissolved in polyethylene glycol of molecular weight 400 (100 parts) to form a solution of Li[SnCl$_2$I]. The catalyst solution, tin sheet (119 parts), butyl chloride (370 parts) and dibutyltin dichloride (100 parts) were heated at 150° C. for 24 hours in a rocking autoclave. All the tin reacted. Distillation gave a main fraction consisting of mono-, di- and tri-butyltin chlorides (324 parts) (found: Sn, 34.8%; Cl, 23.3%) and a residue of the catalyst (154.7 parts).

Example 16.—Reaction of octyl chloride using

Li$_2$[oct$_2$SnCl$_4$]

with polyoxyethylene glycol and octyl iodide

Lithium chloride (2.0 parts) and dioctyltin dichloride (50 parts) were dissolved in polyoxyethylene glycol of molecular weight 400 (50 parts) and added to a mixture of tin sheet (50 parts), octyl iodide (36 parts) and octyl chloride (250 parts). Tin (43 parts) reacted in 10¼ hours to give a mixture of octyltin chlorides.

Example 17.—Reaction of octyl chloride using Li[SnCl$_3$] with polyoxyethylene glycol and octyl iodide Lithium chloride (2.0 parts), stannous chloride (5.5 parts) and dioctyltin dichloride (50 parts) were dissolved in polyethylene glycol of molecular weight 400 (50 parts). The catalyst solution, tin sheet (50 parts), octyl chloride (250 parts) and octyl iodide (36 parts) were heated at reflux for 9½ hours. Tin (0.4 part) remained unreacted.

The product was washed as in Example 8 to remove the catalysts. Octyltin halides (178 parts) were recovered.

Example 18.—Reaction of butyl bromide using Li[SnBr$_2$I] with Diglyme

Lithium iodide (11.5 parts) and stannous bromide (29 parts) were dissolved in Diglyme (30 parts). The catalyst solution was added to a mixture of tin (60 parts) and butyl bromide (600 parts). The mixture was heated under reflux for 25 hours after which time all the tin had reacted. Distillation gave butyltin bromides (217.5 parts) (found: Sn, 25.7; Br, 40.6%). Thin layer chromatography indicated a mixture of mono- and di-butyltin halides with a small amount of tributyltin halides. The catalyst residue was 39 parts; analysis indicated this to consist largely of Li[SnBr$_3$].

We claim:
1. A process for preparing alkyltin halides which comprises reacting an alkyl chloride, alkyl bromide or alkyl iodide with metallic tin in the initial presence of, as catalyst, a salt containing an inorganic cation and an anion selected from the group consisting of halostannite anions $(SnX_3)^-$ and halostannate anions $(R_nSnX_{(6-n)})^=$ and $(R_nSnX_{5-n})^-$, wherein each X is a chlorine, bromine or iodine atom, each R is an alkyl group, and $n$ is an integer 0–3, thereby forming alkyltin halide and recovering said alkyltin halide.
2. A process for preparing alkyltin halides as claimed in claim 1 wherein the reaction takes place in solvent medium.
3. A process for preparing alkyltin halides as claimed in claim 1 wherein the reaction takes place in an oxygen-containing solvent.
4. A process for preparing alkyltin halides as claimed in claim 1 wherein the reaction takes place in an ether solvent selected from the group consisting of polyoxyethylene glycols, polyoxypropylene glycols and ethers of said glycols.
5. A process for preparing akyltin halides as claimed in claim 1 wherein the reaction takes place in diethylene glycol dimethyl ether solvent.
6. A process for preparing alkyltin halides as claimed in claim 1 wherein the catalyst is a salt of a metal selected from the group consisting of metals of Group I (including ammonium), Group II and Group III.
7. A process for preparing alkyltin halides as claimed in claim 1 wherein the catalyst is preformed.
8. A process for preparing alkyltin halides as claimed in claim 1 wherein the catalyst is formed in situ by adding a metal chloride, metal bromide or metal iodide to a mixture of metallic tin, stannous chloride and an alkyl chloride, alkyl bromide or alkyl iodide thereby forming a catalyst containing the halostannite anion.
9. A process for preparing alkyltin halides as claimed in claim 1 wherein the catalyst is formed in situ by adding metal halide to a mixture of metallic tin, alkyltin halide and alkyl halide thereby forming a catalyst containing the halostannate anion; said halide in each instance being selected from the group consisting of chloride, bromide and iodide.
10. A process for preparing alkyltin halides as claimed in claim 1 wherein the catalyst contains the halostannite anion.
11. A process for preparing alkyltin halides as claimed in claim 1 wherein the catalyst is an alkali metal (including ammonium) halostannite.
12. A process for preparing alkyltin halides as claimed in claim 1 wherein the catalyst is a lithium halostannite.
13. A process for preparing alkyltin halides as claimed in claim 1 wherein the catalyst is LiSnBr$_3$.
14. A process for preparing alkyltin halides as claimed in claim 1 wherein the catalyst contains a halostannate anion.
15. A process for preparing alkyltin halides as claimed in claim 1 wherein the catalyst is an alkali metal (including ammonium) halostannate.
16. A process for preparing alkyltin halides as claimed in claim 1 wherein the catalyst is a lithium halostannate.
17. A process for preparing alkyltin halides as claimed in claim 1 wherein said alkyl halide contains from 3 to 8 carbon atoms.
18. A process for preparing alkyltin halides as claimed in claim 1 wherein the reaction takes place at 50° C.–250° C.
19. A process for preparing alkyltin halides as claimed in claim 1 wherein the alkyl halide is present in stoichiometric excess.

References Cited

UNITED STATES PATENTS 3,297,732   1/1967   Banks _____ 260—429.7

FOREIGN PATENTS 19,117   9/1963   Japan.

TOBIAS E. LEVOW, *Primary Examiner.*

W. F. W. BELLAMY, *Assistant Examiner.*